(12) United States Patent
Moeller

(10) Patent No.: US 7,201,270 B2
(45) Date of Patent: Apr. 10, 2007

(54) DEVICE FOR THE STORAGE AND FEEDING OF PRODUCTS

(75) Inventor: Kurt Moeller, Ferrara (IT)

(73) Assignee: CT Pack S.r.l. (IT)

( * ) Notice: Subject to any disclaimer, the term of this patent is extended or adjusted under 35 U.S.C. 154(b) by 0 days.

(21) Appl. No.: 10/551,483

(22) PCT Filed: Mar. 31, 2003

(86) PCT No.: PCT/IT03/00188

§ 371 (c)(1),
(2), (4) Date: Sep. 29, 2005

(87) PCT Pub. No.: WO2004/087543

PCT Pub. Date: Oct. 14, 2004

(65) Prior Publication Data

US 2006/0201785 A1    Sep. 14, 2006

(51) Int. Cl.
*B65G 35/04* (2006.01)

(52) U.S. Cl. .................... 198/347.1; 198/817

(58) Field of Classification Search ............ 198/347.1, 198/370.1, 370.03, 435, 468.3, 622, 817
See application file for complete search history.

(56) References Cited

U.S. PATENT DOCUMENTS

| | | | |
|---|---|---|---|
| 1,837,605 A * | 12/1931 | Baker ................... 198/465.3 |
| 3,833,133 A * | 9/1974 | Friedrich ............... 414/331.02 |
| 4,113,082 A * | 9/1978 | Timin ..................... 198/339.1 |
| 5,088,588 A * | 2/1992 | Davis et al. ............ 198/347.3 |
| 5,088,589 A * | 2/1992 | Geerts .................. 198/457.05 |
| 5,108,163 A * | 4/1992 | Nakatsu ..................... 312/268 |
| 5,141,128 A * | 8/1992 | Pippin .......................... 221/84 |
| 5,253,743 A * | 10/1993 | Haas et al. ............. 198/347.1 |
| 5,350,050 A * | 9/1994 | Franke ................... 198/347.1 |
| 5,473,978 A * | 12/1995 | Colombo .................. 99/443 C |
| 5,636,722 A | 6/1997 | Koop |
| 5,735,380 A * | 4/1998 | Schneider et al. ....... 198/347.1 |
| 6,223,881 B1 * | 5/2001 | Carle ...................... 198/347.3 |
| 6,699,006 B2 * | 3/2004 | Schlimgen et al. ......... 414/801 |
| 6,758,321 B2 * | 7/2004 | Spettl ..................... 198/347.1 |

* cited by examiner

*Primary Examiner*—Douglas A. Hess
(74) *Attorney, Agent, or Firm*—James C. Eaves, Jr.; Greenebaum Doll & McDonald PLLC

(57) ABSTRACT

A device for the accumulation and release of products disposed in ranks, comprises a storage unit with respective receiving and delivery openings for the products, a plurality of container elements movably guided within the storage unit between the receiving and delivery openings along a predetermined path, each container element being provided with a plurality of support surfaces for containing ranks of products, actuating means for controlling the movement of the container elements in the storage unit so as to present each container element to be filled in sequence at the receiving opening, for loading incoming ranks of products onto the respective support surfaces of the container and to conduct the previously filled containers to the delivery opening for the release of respective ranks of products leaving the storage units.

20 Claims, 5 Drawing Sheets

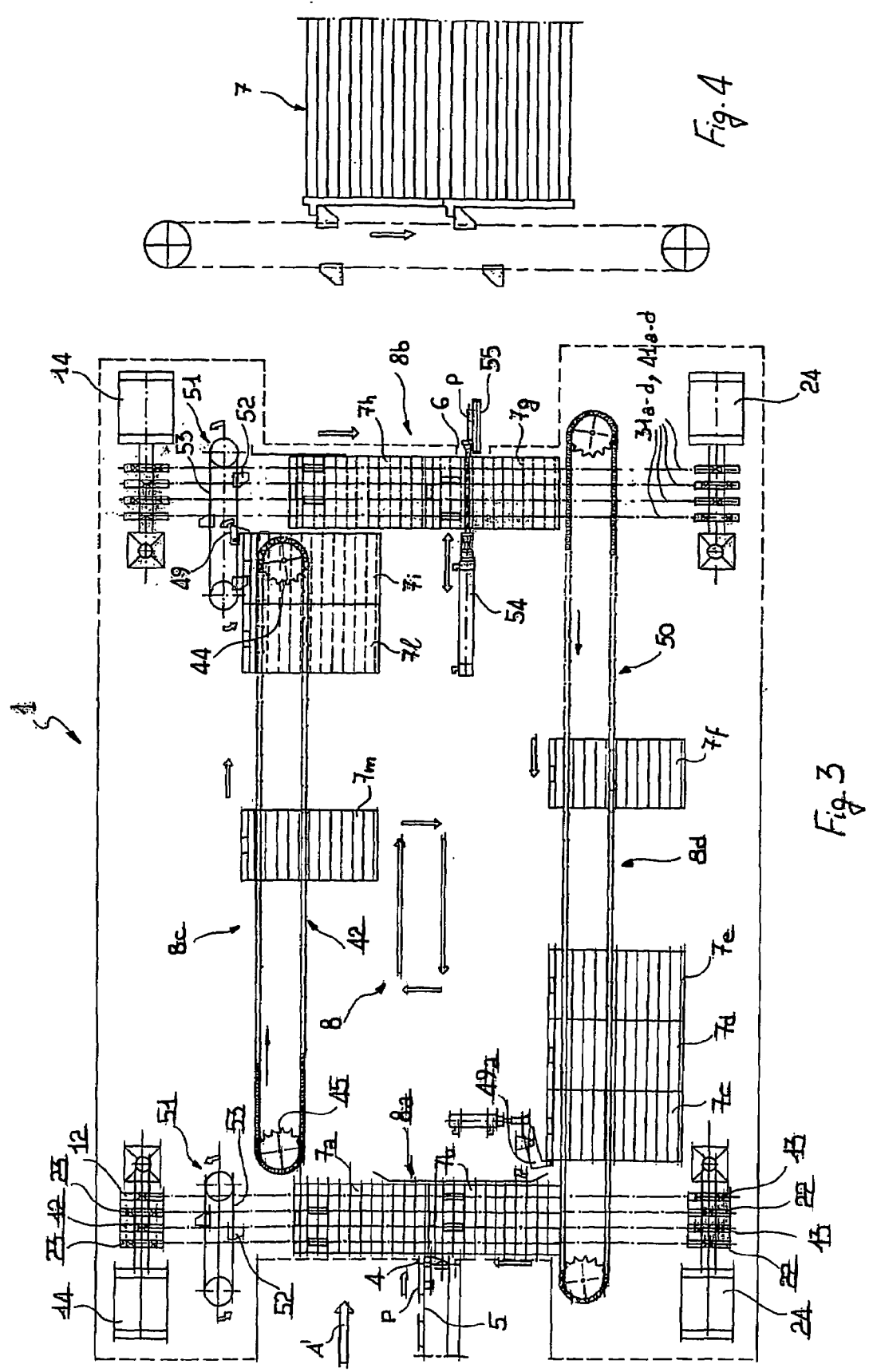

DEVICE FOR THE STORAGE AND FEEDING OF PRODUCTS

TECHNICAL FIELD

The present invention concerns a device for the accumulation and release of products disposed in ranks, in particular for feeding packaging lines for such products, according to the preamble of main claim No. 1.

TECHNOLOGICAL BACKGROUND

Devices of the aforesaid type are widely used in packaging lines for confectionary products, such as chocolate bars, biscuits or others of similar type, in which such products are moved, on conveying lines, disposed in ranks or groups of ranks spaced from one another (by ranks there are meant in the present context rows of aligned products, in which the rows are disposed perpendicularly to the direction of advance of the products). Between these conveying lines and the packaging machines there is typically interposed a storage unit for the products to permit regular feeding at a predetermined and uniform rhythm of the packaging machine, and thus to render said feeding independent of the speed and variations in the flow of the incoming ranks.

With such storage units it is therefore possible to feed efficiently different automatic packaging lines having speeds and feeding rhythms programmed according to the type of product being dealt with.

Typically, such storage units comprise a magazine within which a plurality of container elements is supported and conducted in series along a path which optimizes the storage capacity. In general, the containers are regularly spaced from one another at a predetermined pitch and each comprises a plurality of shelves capable of supporting and containing respective ranks of products. The provision of one or more conveyor chains on which the containers are secured at a regular pitch is typical.

The slide path of the chain is further selected such that each container is conducted in sequence to the receiving opening for loading onto each of its shelves one or more ranks of products coming into the storage unit and, at the same time, a previously loaded container is conducted, by the effect of movement of the chain, to the delivery opening for the release of the products leaving the storage unit.

Storage units of this type normally extend in height and provide a vertical ascending section of the chain for loading the containers in sequence through the receiving opening and a descending vertical section of the chain for positioning the containers at the delivery opening and consequently unloading the products from the storage unit. These sections are part of the overall path, which may furthermore have a certain number of bends or returns having the function of maximizing the number of containers (and therefore of products) that can be accumulated within the storage unit.

A limit to be encountered in the known storage devices having the aforesaid characteristics lies in the fact that the distance between the last support shelf of one container and the first shelf of the container following it is generally different from the pitch existing between adjacent shelves of the same container. This makes it necessary to move the chain at different speeds in order to guarantee the same loading rhythm when passing from the last shelf of one container to the first shelf of the following container, both in the loading phase and in the phase of unloading of the products from the storage unit. This inequality of pitches produces accelerations and decelerations of the containers which may induce disturbing dynamic stresses in the movement of the containers themselves, for example inducing unwanted oscillating movements.

To these dynamic actions are further added unwanted swaying movements of the containers induced when passing through the winding sections of the path, which sections are produced by the bends of the chain created within the magazine to increase the storage capacity thereof. The rotational and translational movements induced by such curved paths may further compromise the alignment of the ranks of products supported in the containers. On the other hand, a limitation of such stresses and swaying movements is obtainable by reducing the speed of translation of the chain, thus requiring, however, much greater storage times for the loading of the magazine, to the detriment of the overall efficiency and productivity of the plant.

DESCRIPTION OF THE INVENTION

The problem underlying the present invention is that of providing a device for the accumulation and release of products disposed in ranks, which is structurally and functionally designed so as to make it possible to overcome the limits mentioned with reference to the prior art cited.

This problem is solved by the invention by means of a device for the accumulation and release of products which is produced according to the following claims.

BRIEF DESCRIPTION OF THE DRAWINGS

Further characteristics and advantages of the invention will become clearer from the following detailed description of one of its preferred exemplary embodiments illustrated, by way of non-limiting example, with reference to the appended drawings, in which:

FIG. 3 is a view corresponding to that of FIG. 1, in a second operating phase of the storage device according to the invention, FIG. 4 is a partial diagrammatic view in front elevation according to the arrow A' of FIG. 3.

PREFERRED WAY OF CARRYING OUT THE INVENTION

Figure 2:
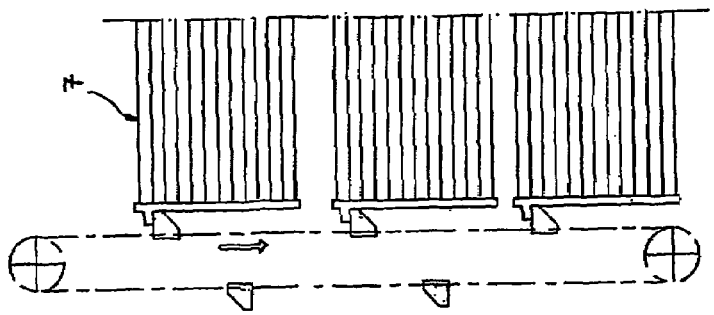
FIG. 2 is a partial diagrammatic view in front elevation according to the arrow A of FIG. 1.

With reference to the figures mentioned, the reference 1 indicates as a whole a device for the accumulation and release of products P disposed in ranks, produced according to the present invention. The device is of the type comprising a storage unit 2 supported by a fixed structure, not shown in the drawings, and the body or outer containment casing 3 of which is shown diagrammatically by dashed lines in the views in FIGS. 1 and 3.

The storage unit 2 is provided with a receiving opening 4 through which are introduced the products P distributed in incoming ranks on a feed belt 5, and with a delivery opening 6 for the release of the products P leaving the storage unit 2.

The storage unit 1 further comprises a plurality of container elements 7 which are movably guided within the storage unit 2, between the openings 4 and 6, along a path 8 closed in a ring and defined by four respective rectilinear branches designated by 8*a*, 8*b*, 8*c* and 8*d*. More particularly, the path 8 has a rectangular configuration with the pairs of branches 8*a*, 8*b* and 8*c*, 8*d* parallel and opposed to one another. The branches 8*a* and 8*b* conveniently extend vertically, meaning by the term "vertical" the direction perpendicular to the bearing surface at the base of the storage unit 2, along which are respectively located the receiving opening 4 and the delivery opening 6. On the other hand, the branches 8*c*, 8*d* extend in a "horizontal" direction, that is to say, parallel to the bearing surface of the storage unit.

Each container element 7 has a plurality of support surfaces, all indicated by 9, rising one above the other and spaced from one another at a regular pitch and capable of receiving one or more incoming ranks of products from the belt 5. Said container elements 7 are conducted in sequence along the path 8 (in a clockwise direction looking at FIG. 1) to bring each container 7 to be filled to the opening 4, in order to load onto the surfaces 9 the ranks of products P fed by the belt 5, and also to conduct the previously filled containers 7 to the delivery opening 6 for the release of the products P leaving the storage unit.

On the path 8, the branch 8*a* is the ascending branch for loading of the containers 7, while the branch 8*b* is the descending branch for unloading the containers. The branch 8*c* is the branch for storing the containers 7, along which the latter are held in position one against the other, as will appear clearly hereinafter. The branch 8*d* is the branch for transferring the containers 7, already unloaded along the branch 8*b*, and for storing them while waiting to be loaded again along the ascending branch 8*a*.

Along the branches of the path 8 means are also provided for actuating the containers 7. It should be noted that the actuating means active along the branches 8*a* and 8*b* are structurally and functionally similar to one another and the description will therefore be limited to the ascending branch 8*a*, it being intended that corresponding actuating means are provided for the descending branch 8*b* and, where appropriate, details common to the two aforesaid branches being designated by the same numerical references. Equally, actuating means structurally and functionally similar to one another are provided along the storage branches 8*c* and 8*d*, and therefore the description will be limited with reference only to the storage branch 8*c*, details common to these two branches of the path being designated, where appropriate, by the same numerical references.

Figure 8:
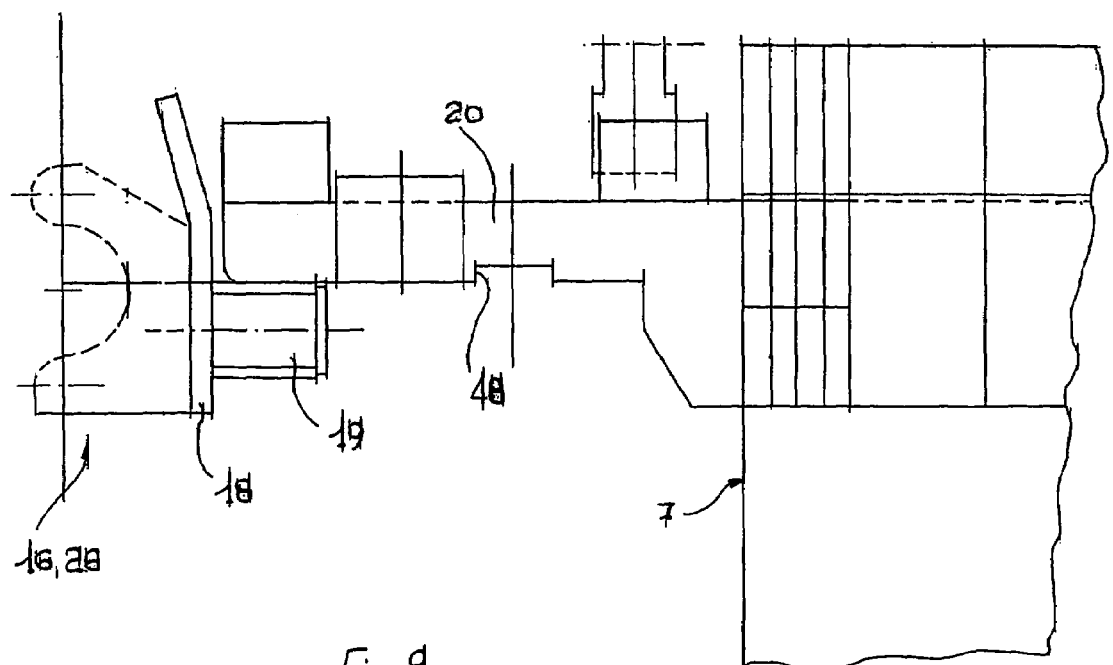
FIG. 8 is a partial view in front elevation, on an enlarged scale, of a detail of FIG. 5.

The actuating means arranged for the movement of the containers 7 along the branch 8*a* comprise first and second separate control means 10, 11, respectively associated in sequence with one or another container 7, disposed in succession to one another, of each pair of containers that can be observed in the storage unit 2. In other words, containers 7 consecutive to one another along the path, which engage the branch 8*a*, are actuated in sequence, respectively by the actuating means 10 and 11, such, that both of said containers 7 are conducted from and towards the receiving opening 4 with independent movements with respect to one another. The first control means 10 comprise two pairs of motor-driven chains 11*a*, 11*b* and 11*c*, 11*d*, wound on respective drive 12 and return 13 sprockets and also extending with their operative branches parallel to the ascending branch 8*a*. The reference 14 indicates a servomotor capable of driving in synchronization the drive sprockets of the chains 11*a*, 11*b* and, by means of a return 15, the drive sprockets of the opposed pair of chains 11*c*, 11*d*. Each pair of chains is further provided with respective coupling means, indicated as a whole by 16, capable of engaging respective complementary coupling means 17 provided on the opposed sides of the containers 7 for raising same along the ascending branch 8*a* of the storage unit 2. Said coupling means 16 comprise respective plate-like members 18, secured, at a regular pitch, to each pair of chains 11*a*, 11*b* and 11*c*, 11*d*, from which there are raised in the same direction and transversely, support rollers 19 capable of interfering with portions of respective wings 20 protruding from the opposed sides of the containers, as shown in FIGS. 5 and 8.

The actuating means 11 in their turn comprise two pairs of motor-driven chains 21*a*, 21*b* and 21*c*, 21*d* wound on respective drive 22 and return 23 sprockets and also extending with their operative branches parallel to the ascending branch 8*a*. The reference 24 indicates a servomotor capable of controlling in synchronization the drive sprockets of the chains 21*a*, 21*b* and, by way of a return 25, the drive sprockets of the opposed pair of chains 21*c*, 21*d*. Each of said pairs of chains is further provided with respective coupling means, indicated as a whole by 26, structurally identical to the coupling means 16, which are capable of engaging the complementary coupling means 17 provided on the opposed sides of the containers 7 for raising same, along the ascending branch 8*a*. The coupling means 26 are secured to the chains 21*a*–21*d* at a regular pitch, conveniently equal to that provided for the coupling means 16.

Figure 5:
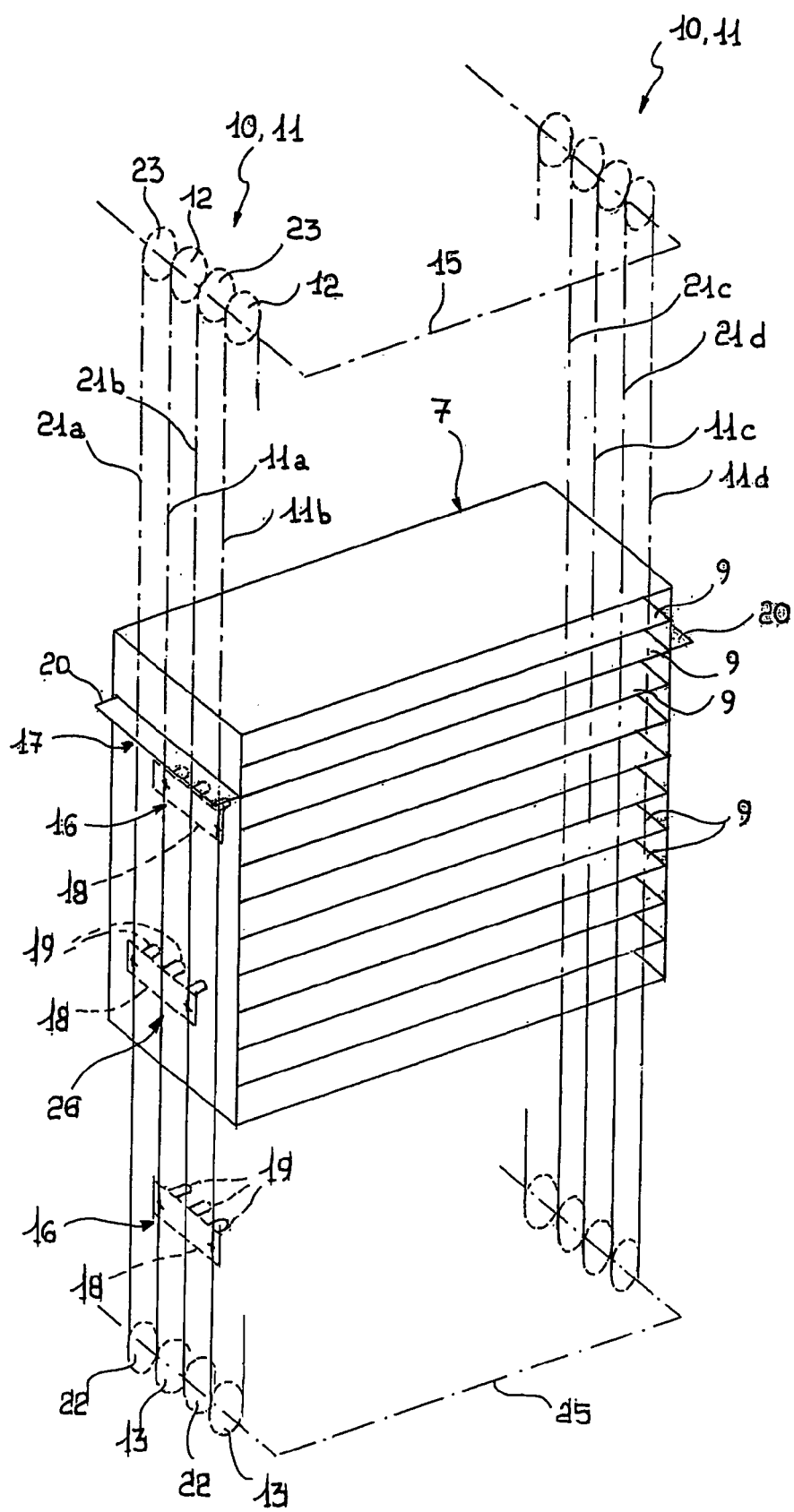
FIG. 5 is a diagrammatic perspective view of a detail of the device of the preceding figures.
Figure 6:
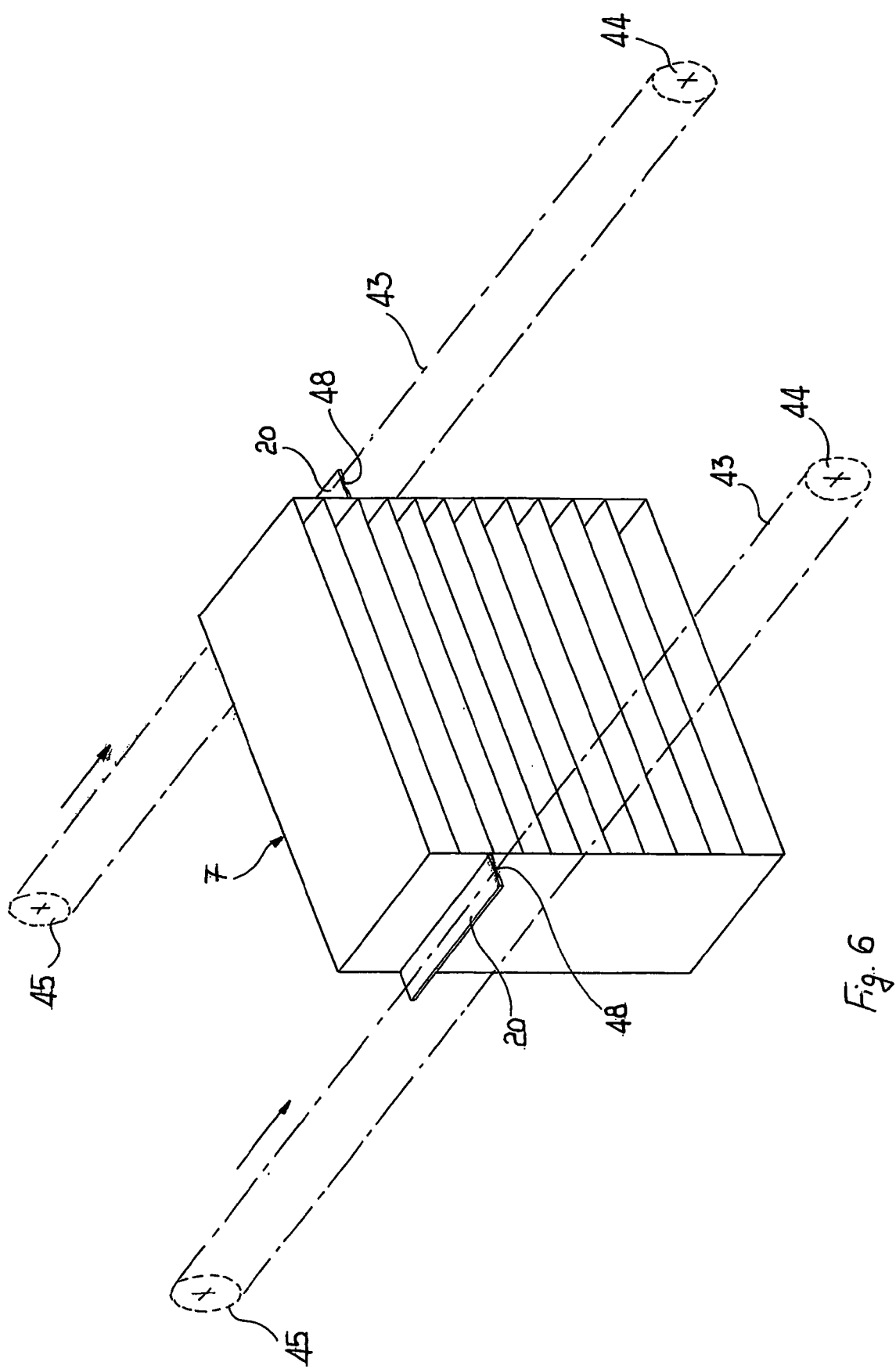
FIG. 6 is a diagrammatic perspective view of a further detail of the device of FIGS. 1 to 4.

It will be noted, with particular reference to FIG. 5, that on the one hand the chains 11*a*, 11*b*, 21*a*, 21*b* and, on the other hand the chains 11*c*, 11*d*, 21*c*, 21*d* have return axes coaxial with one another with the operative branches of each of the pairs of chains parallel and mutually spaced.

Figure 7:
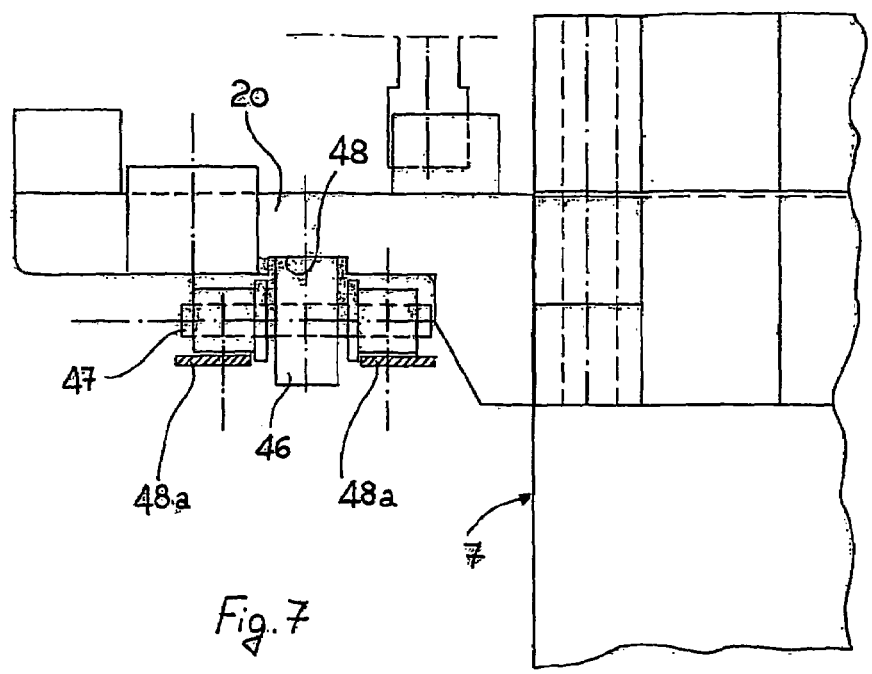
FIG. 7 is a partial view in front elevation, on an enlarged scale, of a detail of FIG. 6.

The actuating means provided along the descending branch 8*b* comprise first and second separate control means, these also, for the sake of simplicity, indicated by 10, 11, in their turn including respectively two pairs of chains 31*a*, 31*b*, 31*c*, 31*d* and 41*a*, 41*b*, 41*c*, 41*d*, having the same structure as the chains associated with the ascending branch 8*a*, to the description of which reference should be made for any further detail. In this case also, containers 7 consecutive to one another, which engage the branch 8*b*, are moved from and towards the delivery opening 6 with independent movements with respect to one another. For the movement of the containers along the storage branch 8*c*, first conveying means are provided, indicated as a whole by 42, and capable of conducting the containers 7 (filled with products P) one after the other in a collected position and one against the other. Said means 42 comprise pairs of motor-driven chains 43 wound on respective drive 44 and return 45 sprockets, and having their operative branches elongated horizontally along the branch 8*c*. More particularly, pairs of double motor-driven chains are provided, bearing idle rollers 46 pivoted on pins 47 constituting pins of two single chains side by side and firmly secured to each other (FIG. 7). The rollers 46 are mounted so as to be idle, and support the wings 20 of the containers 7, at a groove 48 provided at the bottom on the wings themselves. The chains 43 in their turn are supported and slidably guided on guide profiles 48*a* extending parallel to the branch 8*c* and connected to the fixed structure of the storage unit 2. In the movement of the chains 43, each container 7 is moved jointly with the latter along the branch 8*c*, owing to the friction developed in the bearing contact of the wings 20 on the respective idle rollers 46. Arresting means, indicated by 49, are provided at the arrival end of the branch 8c and are capable of interfering with the container 7 to retain it (together with the remaining containers pushed against it) in one direction in the end position reached, independently of the movement of the chains, owing to the creep and/or relative rolling between the idle rollers and the wings of the containers. The accumulation of the containers 7 and their retention is therefore ensured by the arresting means 49 during the continuous movement of the chains 43.

For the movement of the containers 7 along the lower transfer branch 8d, second conveying means are provided, indicated as a whole by 50, having a structure substantially identical to the conveying means 42. These also include pairs of double motor-driven chains 43 with idle support rollers 46 for supporting the containers 7, for details of which reference should be made to the description provided previously with reference to the branch 8c, co-operating with arresting means 49a in a manner entirely similar to those provided in the branch 8c.

The reference 51 designates thrust means arranged for transferring each of the containers 7, in the passage along the path 8, from the ascending branch 8a to the storage branch 8c and from the latter to the descending branch 8b. Said thrust means 51 are produced for example by means of one or more thrust members 52 firmly secured to the movement of a chain 53 and capable of interfering with the container 7 to move same from one branch to the other at the confluence of said branches along the path 8.

The reference 54 indicates a thrust member capable of displacing the ranks of products P from each support surface 9 to an outlet belt 55, in the phase of unloading of the containers 7 and release of the products leaving the storage unit 2.

Figure 1:
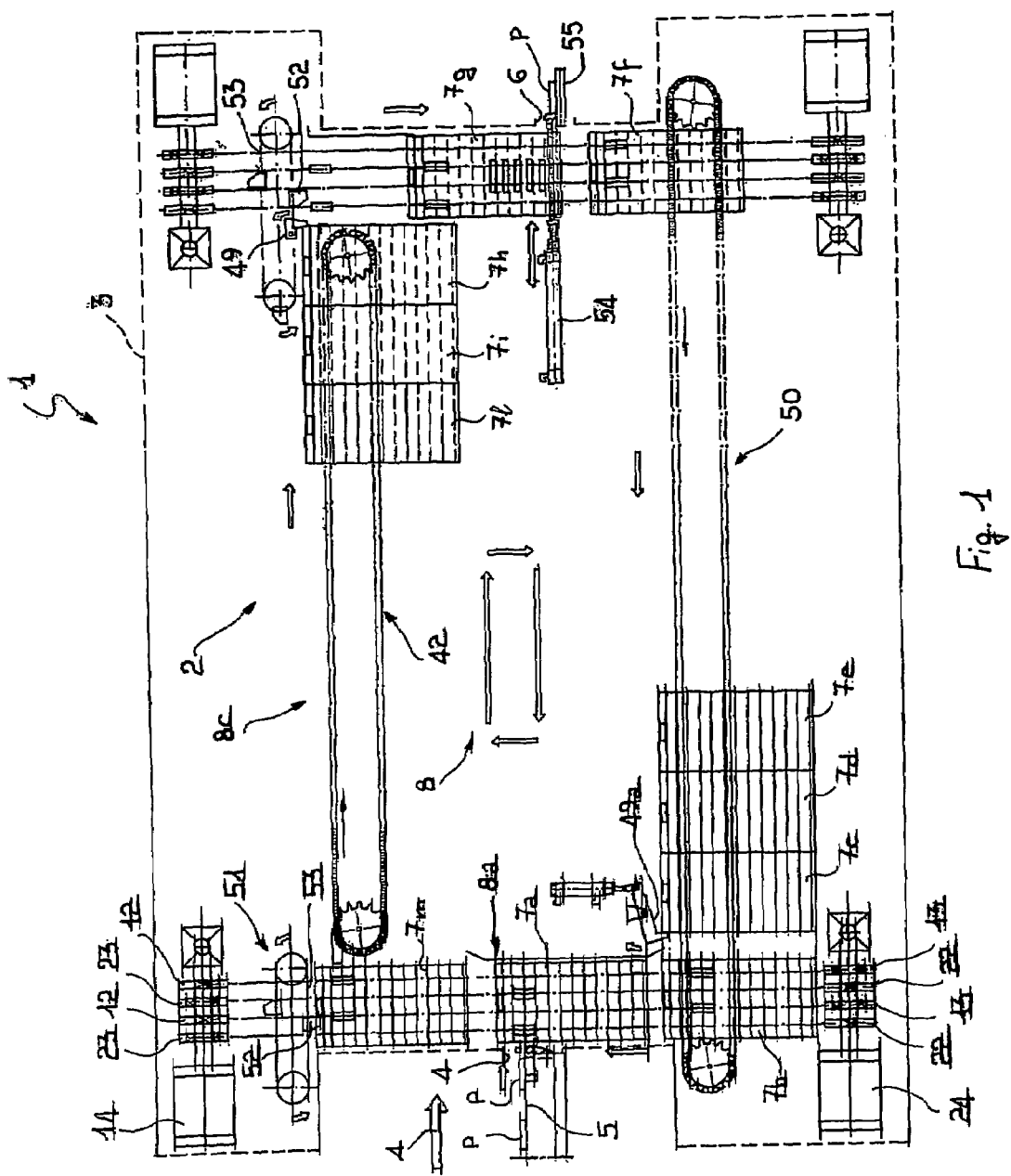
FIG. 1 is a diagrammatic view in side elevation of a storage device according to the present invention in a first operating phase.

For greater understanding of the operation of the device described hereinafter, the container members illustrated in FIGS. 1 and 3 are designated individually by the numerical references 7a, 7b, 7c, 7d, 7e, 7f, 7g, 7h, 7i, 7l and 7m, so as to facilitate detection of the position thereof within the storage unit.

In an initial reference phase of operation, illustrated in FIG. 1, the container 7a is positioned at the receiving opening 4, with the belt 5 in alignment with the top support surface 9 of the container 7a for the transfer of a rank of products P onto said surface. The container 7a is raised by the control means 10, by means of coupling with the chains 11a–11d. A sensor 57 is provided to detect the passage of the rank and to operate the servomotor 14 in order to displace the container 7a by a pitch (equal to the distance between consecutive surfaces 9) so as to complete the loading of all the support surfaces 9 with respective ranks of products P.

In this phase the container 7b is uncoupled from the storage branch 8d and is positioned below the container 7a. The containers 7c, 7d, 7e are retained in a position one against the other on the branch 8c by the arresting means 49a. The container 7m, after filling has taken place, is raised until it is aligned with the conveyor chain 43 for its transfer along the branch 8c by the thrust means 50. The full containers 7l, 7i, 7h are stored on the branch 8c, retained by the arresting means 49. The container 7g is displaced by the chains 31a–31d (by means of mutual engagement of the respective coupling and complementary coupling means 16, 17) by an intermittent movement to the delivery opening 6 along the descending branch 8b to allow the unloading of the ranks of products P from the respective support surfaces 9. The container 7f is coupled to the chains 41a–41d after the unloading of the products onto the belt 55 has taken place and Is displaced in a continuous motion in the direction of the storage branch 8d for empty containers.

In a following phase of operation of the device 1, illustrated in FIG. 3, the container 7a, raised by the control means 10, is at the end of the filling phase with the last support surface 9 (that at the bottom level) aligned with the belt 5 for loading into the container 7a the last rank of products P. In this phase the container 7b is moved closer to the container 7a by means of the respective separate control means 11 until it reaches a position in which the distance between the last surface 9 of the container 7a and the top surface of the container 7b is equal to the pitch existing between consecutive surfaces 9 of the containers. In this way the ranks of products can be introduced into the containers at an always constant pitch at a uniform rhythm also during the passage from one container to the next. FIG. 4 shows the lined up state of the containers 7a, 7b.

In this phase, in addition, the containers 7c, 7d, 7e are held stored on the branch 8d by actuation of the arresting means 49a. The container 7f, previously emptied, is in transit along the branch 8d until it reaches the position pushed against the container 7e. The container 7m, transferred onto the branch 8c, is moved along this storage branch. The container 7h is transferred by the thrust means 51 onto the descending branch 8b and is controlled by the chains 41a–41d while approaching the container 7g. Owing to the control movements, independent of one another, of the containers 7g and 7h, the distance between the top surface 9 of the container 7h and the last lower surface of the container 7h may be made equal to the pitch existing between the surfaces 9 of the same container, so as to ensure release of the ranks of products at a constant pitch in a uniform rhythm also during the passage from one container to the next.

The phases illustrated in FIGS. 1 and 3 are then repeated cyclically in order to obtain in sequence the loading of each container along the ascending branch 8a and the emptying of corresponding containers along the descending branch 8d.

It is understood that the number of containers provided in the storage device may vary according to specific requirements. It should be noted that the storage capacity is substantially linked to the number and to the dimensions of the containers that can be pushed one against one the other along the storage branch 8c, and the storage volume can therefore be increased for example by elongating the storage unit horizontally and/or increasing the number of support surfaces of each container. The ascending and descending branches of the storage device, which define the overall vertical dimension thereof, serve substantially to ensure the filling and emptying of at least a pair of containers consecutive to each other, by means of movements independent of one another. In this way the phases of filling and emptying of the containers are rendered substantially independent of the movement of the remainder of the containers within the storage unit.

The invention thus solves the problem posed while providing numerous advantages with respect to the known solutions.

A principal advantage lies in the fact that in the device according to the invention it is possible to maintain, both in the filling phase and in the emptying phase, a distance between the last support surface of one container and the first surface of the container adjacent thereto which is equal to the pitch of the support surfaces. This equality of pitches permits movement of the containers at constant speed in the loading/unloading phases without inducing acceleration/deceleration of the containers themselves, responsible for any unwanted swaying motions.

Another advantage is due to the fact that in the ascending and descending branches the containers are controlled individually with movements independent of one another. Since the full container can in fact be moved away at a speed different from that consecutive thereto in the filling phase, the efficiency and productivity of the device are increased.

Another advantage is that the container is not bound, as in the known systems, to a fixed chain pitch, which pitch constrains the entire movement of the series of containers. According to the invention, the container filled on the ascending branch at a certain displacement speed, may directly follow the path towards the storage and emptying side at a different (and higher) speed and at a pitch different from the container which precedes it. This advantage is also reflected in the phase of emptying of the containers.

Yet another advantage is that the movement necessary for passing from one container to the next during filling, in contrast to the known systems, does not limit the running speed. In the known solutions, in fact, the entire series of containers is moved along the path defined in the storage unit with a need for considerable power for moving the entire train of containers. According to the invention, the branches for filling and emptying of the containers are actuated independently of the branches for storage of the containers, with consequently less power required and the possibility of using different displacement speeds in order to optimize the storage and release times for products in the storage unit.

Moreover, in the device of the invention, the provision of rectilinear branches in the loading/unloading and storage paths makes it possible to eliminate unwanted oscillating and swaying movements of the containers which, on the other hand, are generated in the known systems, especially in the presence of returns and bends in the paths described within the storage units.

Another advantage is that the containers of the device according to the invention are not rigidly secured to the conveyor chains, with consequent ease of replacement and/or removal for maintenance operations (for example in the washing operations).

Yet another advantage is that the device according to the invention makes it possible to obtain a reduced travel for each container from the filling point to the emptying point, without the need for a complete revolution of travel of the chain, as provided in the known systems.

The invention claimed is:

1. A device for the accumulation and release of products (P) disposed in ranks, of the type comprising:
   a storage unit (2) with respective receiving (4) and delivery (6) openings for said products,
   a plurality of container elements (7) movably guided within said storage unit (2) between said receiving (4) and delivery (6) openings along a predetermined path (8), each container element (7) being provided with a plurality of support surfaces (9) for containing ranks of products (P),
   actuating means being provided to control the movement of said container elements (7) in the storage unit (2) so as to present each container element (7) to be filled in sequence at the receiving opening (4), for loading incoming ranks of products onto the respective support surfaces (9) of the container, and to conduct the previously filled containers to the delivery opening (6) for the release of respective ranks of products leaving the storage unit (2),
   characterised in that said actuating means comprise first and second separate control means (10, 11) respectively associated in sequence with one and another container (7) in succession to one another of each pair of containers (7) to be found in said plurality of container elements, so that both of said containers (7) in succession to one another are conducted from and towards said receiving opening (4) and/or delivery opening (6) of the storage unit (2) by independent movements with respect to one another.

2. A device according to claim 1, wherein said first and second control means (10, 11) comprise motor-driven conveyor chains.

3. A device according to claim 2, wherein said first and second control means (10, 11) respectively comprise at least a first (11a, 11b; 11c, 11d) and at least a second (21a, b; 21c, d) pair of chains closed in a ring, the chains of each pair being provided with respective coupling means (16; 26) capable of coupling with respective complementary coupling means (17) provided on said containers (7) for conveying same along at least part of the operative branches of said chains, such that empty containers are conducted, in succession to one another, by both pairs of chains, with independent movements of one container (7) with respect to the other, from and towards said receiving opening (4), for the storage of the products (P) in said containers (7).

4. A device according to claim 3, wherein said first and second control means (10, 11) further comprise at least a third (31a, 31b; 31c, 31d) and respectively at least a fourth (41a, 41b; 41c, 41d) pair of chains closed in a ring and provided with coupling means (16, 26) capable of coupling with respective complementary coupling means (17) on said containers for conveying the containers (7) along at least part of the operative branches of said chains, such that the containers (7) filled with products are conducted, in succession to one another, by both pairs of chains, with independent movements of one container with respect to the other, from and towards the delivery opening (6) for the release of the products (P) from the storage unit (2).

5. A device according to claim 4, wherein said at least third (31a, 31b; 31c, 31d) and said at least fourth (41a, 41b; 41c, 41d) pair of chains have respective return axes coaxial with one another with the operative branches of said pairs of chains parallel and mutually spaced.

6. A device according to claim 4, wherein the second coupling means (16) provided on said at least third (31a, 31b; 31c, 31d) pair of chains are disposed at an alternating pitch with the corresponding coupling means (26) provided on said at least fourth (41a, 41b; 41c, 41d) pair of chains.

7. A device according to claim 4, wherein said coupling means (16, 26) are disposed at a regular pitch along said at least first (11a, 11b; 11c, 11d) and said at least second (21a, b; 21c, d) pair of chains and, respectively, along said at least third (31a, 31b; 31c, 31d) and said at least fourth (41a, 41b; 41c, 41d) pair of chains.

8. A device according to claim 3, wherein said at least first (11a, 11b; 11c, 11d) and said at least second (21a, b; 21c, d) pair of chains have respective return axes coaxial with one another with the operative branches of each of the pairs of chains parallel and mutually spaced from one another.

9. A device according to claim 3, wherein the coupling means provided on said at least first (11a, 11b; 11c, 11d) pair of chains are disposed at an alternating pitch with the corresponding coupling means (26) provided on said at least second (21a, b; 21c, d) pair of chains, so that said container elements (7) are coupled one after the other, alternately by the first and the second pair of chains.

10. A device according to claim 2, wherein said first and second control means (10, 11) further comprise at least a third (31*a*, 31*b*; 31*c*, 31*d*) and respectively at least a fourth (41*a*, 41*b*; 41*c*, 41*d*) pair of chains closed in a ring and provided with coupling means (16, 26) capable of coupling with respective complementary coupling means (17) on said containers for conveying the containers (7) along at least part of the operative branches of said chains, such that the containers (7) filled with products are conducted, in succession to one another, by both pairs of chains, with independent movements of one container with respect to the other, from and towards the delivery opening (6) for the release of the products (P) from the storage unit (2).

11. A device according to claim 1, wherein the path (8) of movement of the containers (7) in the storage unit (2) is in the shape of a closed ring and comprises a first branch (8*a*) and a second opposed branch (8*b*) which are respectively provided at the receiving opening (4) and the delivery opening (6) for said products, said first and second branch (8*a*, 8*b*) being connected, in operation, at their respective ends by a respective third (8*c*) and fourth branch (8*d*).

12. A device according to claim 11, wherein at least the first (8*a*) or the second branch (8*b*) of the path has a rectilinear configuration.

13. A device according to claim 12, wherein said first (8*a*) and second branch (8*b*) have a rectilinear development respectively defined by said at least first (11*a*, 11*b*; 11*c*, 11*d*) and said at least second (21*a, b*; 21*c, d*) pair of chains and by said at least third (31*a*, 31*b*; 31*c*, 31*d*) and fourth (41*a*, 41*b*; 41*c*, 41*d*) pair of chains.

14. A device according to claim 11, wherein said third (8*c*) and fourth branch (8*d*) have a rectilinear configuration and the path formed by said first, second, third and fourth branches (8*a*, 8*b*, 8*c*, 8*d*) is quadrilateral overall, with pairs of opposed branches parallel to one another.

15. A device according to claim 14, wherein the path formed by said branches (8*a*, 8*b*, 8*c*, 8*d*) has a substantially rectangular configuration.

16. A device according to claim 11, wherein said first and second branch (8*a*, 8*b*) extend transversely to the third (8*c*) and fourth branch (8*d*).

17. A device according to claim 11, comprising first conveying means (42) acting on the containers (7) in transit on the third branch (8*c*) of the path, in order to accumulate in a position one against the other the containers filled along the first branch (8*a*) of the path.

18. A device according to claim 17 comprising second conveying means (50) acting on the containers (7) in transit on the fourth branch (8*d*) of the path in order to accumulate in a position one against the other the containers (7) emptied along the second branch (8*b*), wherein said first and second conveying means (42, 50) respectively comprise at least a fifth and at least a sixth pair of chains (43) parallel to and spaced from one another, and also closed in a ring coaxially with one another, the chains being provided with support rollers (46) for supporting respective opposed lateral ends of the containers.

19. A device according to claim 18, wherein said at least fifth and sixth pair of chains (43) comprise respective pluralities of idle rollers (46), pivoted on the chain pins, for supporting said containers (7), respective arresting means (49, 49*a*) being provided at the arrival end of the third (8*c*) and of the fourth branch (8*d*) of the path, for arresting the containers (7) in a position one against the other, as a result of the continuous movement of said chains (43).

20. A device according to claim 17, comprising second conveying means (50) acting on the containers (7) in transit on the fourth branch (8*d*) of the path in order to accumulate in a position one against the other the containers (7) emptied along the second branch (8*b*).

\* \* \* \* \*